United States Patent
Buttlar et al.

(10) Patent No.: US 7,752,497 B2
(45) Date of Patent: *Jul. 6, 2010

(54) METHOD AND SYSTEM TO DETECT ERRORS IN COMPUTER SYSTEMS BY USING STATE TRACKING

(75) Inventors: Joachim von Buttlar, Schoenaich (DE); Janet R. Easton, Woodstock, NY (US); Kenneth J. Oakes, Wappingers Falls, NY (US); Andrew W. Piechowski, Lagrangeville, NY (US); Martin Taubert, Gaertringen (DE); John S. Trotter, Pleasant Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/206,996

(22) Filed: Sep. 9, 2008

(65) Prior Publication Data
US 2009/0006892 A1    Jan. 1, 2009

Related U.S. Application Data

(63) Continuation of application No. 11/223,701, filed on Sep. 9, 2005, now Pat. No. 7,457,985.

(51) Int. Cl.
*G06F 11/00* (2006.01)
(52) U.S. Cl. .............. 714/21; 714/49; 714/5; 718/100
(58) Field of Classification Search ............ 714/21, 714/49, 15
See application file for complete search history.

(56) References Cited

U.S. PATENT DOCUMENTS

| | | | |
|---|---|---|---|
| 4,742,447 A | 5/1988 | Duvall et al. |
| 5,274,809 A | 12/1993 | Iwasaki et al. |
| 5,590,281 A | 12/1996 | Stevens |
| 5,634,037 A | 5/1997 | Sasaki et al. |
| 5,761,413 A | 6/1998 | Frank et al. |
| 5,768,572 A | 6/1998 | George et al. |
| 5,842,208 A | 11/1998 | Blank et al. |

(Continued)

FOREIGN PATENT DOCUMENTS

| EP | 0343646 A2 | 11/1989 |
|---|---|---|
| WO | WO 03045035 A2 | 5/2003 |

*Primary Examiner*—Christopher S McCarthy
(74) *Attorney, Agent, or Firm*—Scully, Scott, Murphy & Presser, P.C.; Arthur Ortega, Esq.

(57) ABSTRACT

Disclosed are a method and system for detecting errors in a computer system including a processing unit to perform tasks to change items. The method comprises the steps of assigning a task control block to the processing unit, and using the task control block to keep track of items being changed by the processing unit. The method comprises the further steps of at defined times, checking the task control block to identify items being changed by the processing unit, and checking the states of said identified items to determine if those states are correct. The preferred embodiment of the invention detects an error when it arises (where possible), and utilizes an infrastructure that allows simple and periodic consistency checks (for example, at designated code points) that detect the error before it causes follow-on problems.

14 Claims, 3 Drawing Sheets

U.S. PATENT DOCUMENTS

| | | | |
|---|---|---|---|
| 6,014,756 | A | 1/2000 | Dottling et al. |
| 6,047,384 | A | 4/2000 | Puhl et al. |
| 6,182,238 | B1 | 1/2001 | Cooper |
| 6,199,179 | B1 | 3/2001 | Kauffman et al. |
| 6,389,447 | B1 | 5/2002 | Singh |
| 6,594,785 | B1 | 7/2003 | Gilbertson et al. |
| 6,675,175 | B2 | 1/2004 | Branch et al. |
| 6,748,438 | B2 | 6/2004 | Palmer et al. |
| 6,823,472 | B1 | 11/2004 | DeKoning et al. |
| 6,826,656 | B2 | 11/2004 | Augsburg et al. |
| 6,834,385 | B2 | 12/2004 | Bohm et al. |
| 6,839,813 | B2 | 1/2005 | Chauvel |
| 6,842,825 | B2 | 1/2005 | Geiner et al. |
| 6,845,470 | B2 | 1/2005 | Austen et al. |
| 6,851,072 | B2 | 2/2005 | Lasserre et al. |
| 6,886,064 | B2 | 4/2005 | Dawkins et al. |
| 7,406,575 | B2 * | 7/2008 | Lam et al. .................... 711/161 |
| 7,457,985 | B2 * | 11/2008 | von Buttlar et al. ........... 714/21 |
| 7,490,272 | B2 * | 2/2009 | Bay et al. ..................... 714/49 |
| 7,490,327 | B1 * | 2/2009 | Branda et al. ............... 718/103 |
| 7,493,617 | B2 * | 2/2009 | Bai et al. .................... 718/100 |
| 7,502,447 | B2 * | 3/2009 | McCormick et al. ..... 379/32.01 |
| 2002/0062459 | A1 | 5/2002 | Lasserre et al. |
| 2002/0069327 | A1 | 6/2002 | Chauvel |
| 2003/0061537 | A1 | 3/2003 | Cha et al. |
| 2005/0166045 | A1 | 7/2005 | Sueyoshi |

* cited by examiner

FIG. 3

| LOCK OWNER | | EXTENDED LOCK INFORMATION | |
|---|---|---|---|
| BITS 00-07 | BITS 08-15 | BITS 16-23 | BITS 24-31 |
| 40 | 1F | 00 | 00 |

FIG. 4

ACTIONS TAKEN WHEN AN ITEM IN STATE SPACE IS MODIFIED
1. COMPLIANCE WITH THE LOCKING PROTOCOL IS VALIDATED.
2. IN THE LOCKED ITEM, THE TCB SLOT IS REMEMBERED WHERE THE LOCK INFORMATION ABOUT THIS ITEM IS KEPT.
3. IF ALL TCB SLOTS ARE IN USE, LOCKINT IS REJECTED.

FIG. 5

ACTIONS TAKEN WHEN AN ITEM HAS BEEN UPDATED AND UNLOCKED
1. IF ITEM WAS ACTUALLY LOCKED, LIST THE ITEM IN THE TCB SLOT.
2. IF ITEM WAS NOT LOCKED, ATTEMPT TO REMOVE ITEM FROM THE TCB OF THE OWNING PROCESSOR.
3. REMOVE ITEM FROM THE USAGE VECTOR OF THE TCB.
4. IF THE ITEM COULD NOT BE LOCATED IN ANOTHER TCB, RECOVERY ACTION IS INITIATED.

METHOD AND SYSTEM TO DETECT ERRORS IN COMPUTER SYSTEMS BY USING STATE TRACKING

CROSS REFERENCE TO RELATED APPLICATIONS

This application is a continuation application of copending application Ser. No. 11/223,701, filed Sep. 9, 2005, the disclosure of which is herein incorporated by reference in its entirety. This application is related to copending application Ser. No. 11/223,725, for "Method And System To Execute Recovery In Non-Homogeneous Multiprocessor Environments," filed herewith; application Ser. No. 11/223,733, for "Method And System For State Tracking And Recovery In MultiProcessing Computing Systems," filed herewith; and application Ser. No. 11/223,877, for "Method And System To Recover From Control Block Hangs In A Heterogeneous Multiprocessor Environment," filed herewith. The disclosures of the above-identified applications are herein incorporated by reference in their entireties.

BACKGROUND OF THE INVENTION

1. Field of the Invention

The present invention in general relates to computer systems, and in particular, to detecting errors in computer systems by using state tracking. Even more specifically, the invention relates to methods and systems that are well suited for detecting such errors in multiprocessing computer systems.

2. Background Art

Multiprocessor computer systems are becoming increasingly important in modern computing because combining multiple processors increases processing bandwidth and generally improves throughput, reliability and serviceability. Multiprocessing computing systems perform individual tasks using a plurality of processing elements, which may comprise multiple individual processors linked in a network, or a plurality of software processes or threads operating concurrently in a coordinated environment.

Many early multiprocessor systems were comprised of multiple, individual computer systems, referred to as partitioned systems. More recently, multiprocessor systems have been formed from one or more computer systems that are logically partitioned to behave as multiple independent computer systems. For example, a single system having eight processors might be configured to treat each of the eight processors (or multiple groups of one or more processors) as a separate system for processing purposes. Each of these "virtual" systems would have its own copy of an operating system, and may then be independently assigned tasks, or may operate together as a processing cluster, which provides for both high speed processing and improved reliability.

The International Business Machines Corporation zSeries servers have achieved widespread commercial success in multiprocessing computer systems. These servers provide the performance, scalability, and reliability required in "mission critical environments." These servers run corporate applications, such as enterprise resource planning (ERP), business intelligence (BI), and high performance e-business infrastructures. Proper operation of these systems can be critical to the operation of an organization and it is therefore of the highest importance that they operate efficiently and as error-free as possible, and rapid problem analysis and recovery from system errors is vital.

The IBM zSeries server product line provides Enterprise Level Computing solutions, which place great importance on maintaining a very high level of system availability and thus on recovering from system errors. The zSeries Channel Subsystem (CSS) has matured to support large I/O configurations, but because of this, increased time may be needed to recover the I/O Subsystem when the system encounters an error.

This CSS maintains a logical representation of the system's I/O Configuration state via internal data structures or controls blocks. These control blocks are used to contain state information for the various operations and tasks that the CSS executes and also to serialize Processing Unit (PU) operations in a Multi-Processing (MP) environment.

A large multiprocessor computer system, such as the IBM zSeries servers, maintains a large state space in data structures (control blocks). Each task in this system modifies a (small) portion of this state. If a task—due to a hardware failure or a code bug—does an erroneous or incomplete modification to that state, this may go unnoticed for an undefined amount of time (until this state is inspected again by a subsequent task). This item of the state space may affect a single or multiple components of the system (devices etc.).

In the past, there was no way of quickly determining which portions of the large state space were currently active (in the process of being modified). When an error occurred, the entire state space had to be assumed to be inconsistent. As a result, this entire state space had to be scanned for activity in order to bring it back to a consistent state.

SUMMARY OF THE INVENTION

An object of the present invention is to enhance and to accelerate recovery actions in computer systems.

Another object of this invention is to utilize an infrastructure in a computer system that allows simple and periodic consistency checks, to detect an error before that error causes follow-on problems.

A further object of the invention is to provide a method and system, particularly well suited for use in multiprocessor computing systems, for detecting errors by using state tracking.

These and other objectives are attained with a method and system for detecting errors in a computer system including a processing unit to perform tasks to change items. The method comprises the steps of assigning a task control block to the processing unit, and using the task control block to keep track of items being changed by the processing unit. The method comprises the further steps of at defined times, checking the task control block to identify items being changed by the processing unit at said defined times, and checking the states of said identified items to determine if said states of said identified items are correct.

The preferred embodiment of the invention, described below in detail, detects an error when it arises (where possible), and utilizes an infrastructure that allows simple and periodic consistency checks (for example, at designated code points) that detect the error before it causes follow-on problems.

Further benefits and advantages of the invention will become apparent from a consideration of the following

BRIEF DESCRIPTION OF THE DRAWINGS

FIG. 3 shows a lock word for a control block.

FIG. 4 is a chart showing actions that are taken when an item in the state space is modified.

FIG. 5 is a second chart showing actions that are taken when an item has been updated and unlocked.

DETAILED DESCRIPTION OF THE PREFERRED EMBODIMENTS

Figure 1:
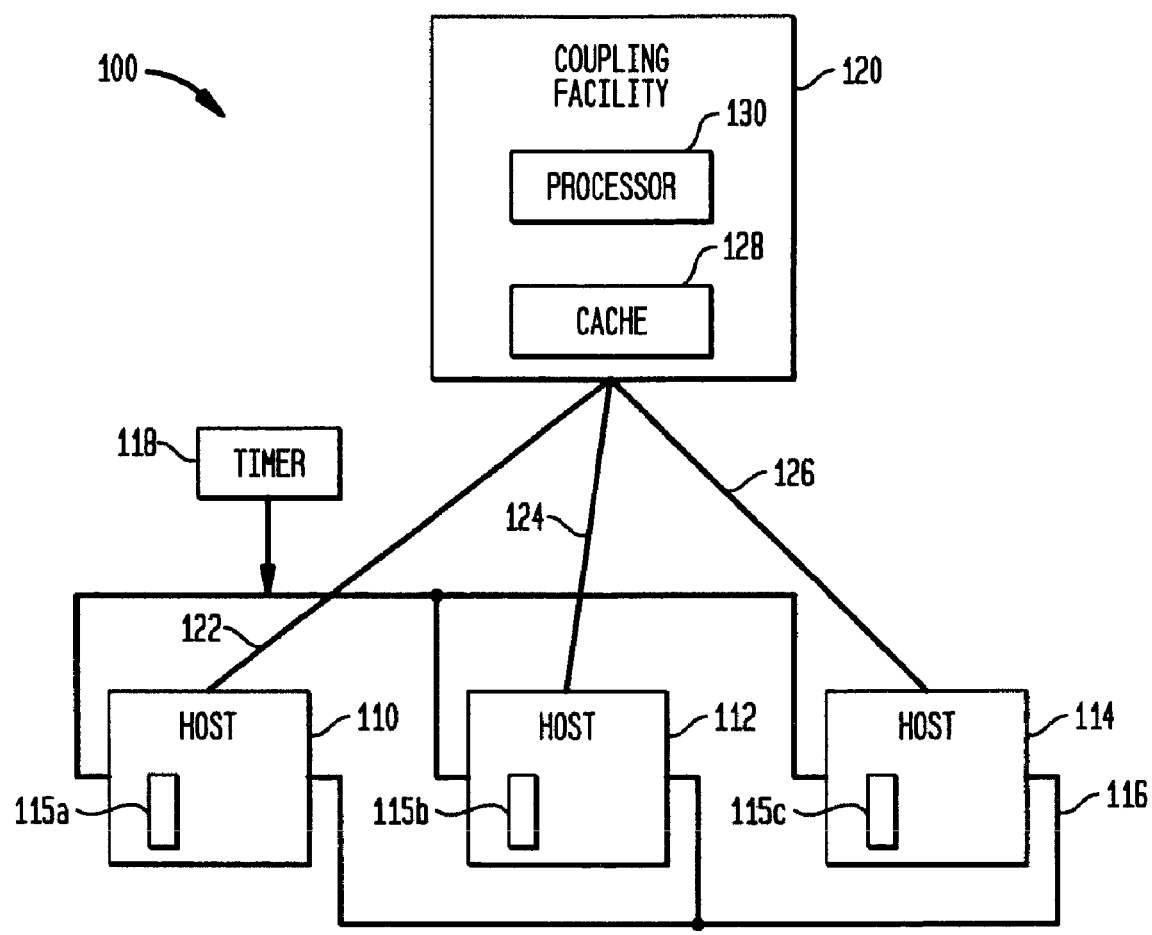
FIG. 1 illustrates a multi-processing computing system with which the present invention may be used.

FIG. 1 illustrates multiprocessor computer system 100 that generally comprises a plurality of host computers 110, 112, 114, which are also called "hosts". The hosts 110, 112, 114 are interconnected with host links 116, which may comprise, for example, Coupling Links, Internal Coupling Channels, an Integrated Cluster Bus, or other suitable links. Rather than using three hosts 110, 112, 114 as in the illustrated example, in alternative embodiments one, two, four, or more hosts may be used. System 100 also includes a timer 118 and a coupling facility 120.

Each host 110, 112, 114 itself is a multiprocessor system. Each host 110, 112, 114 may be implemented with the same type of digital processing unit (or not). In one specific example, the hosts 110, 112, 114 each comprise an IBM zSeries Parallel Sysplex server, such as a zSeries 900, running one or more of the z Operating System (z/OS). Another example of a suitable digital processing unit is an IBM S/390 server running OS/390. The hosts 110, 112, 114 run one or more application programs that generate data objects, which are stored external from or internal to one or more of the hosts 110, 112, 114. The data objects may comprise new data or updates to old data. The host application programs may include, for example, IMS and DB2. The hosts 110, 112, 114, run software that includes respective I/O routines 115a, 115b, 115c. It may be noted that other types of hosts may be used in system 100. In particular, hosts may comprise any suitable digital processing unit, for example, a mainframe computer, computer workstation, server computer, personal computer, supercomputer, microprocessor, or other suitable machine.

The system 100 also includes a timer 118 that is coupled to each of the hosts 110, 112, 114, to synchronize the timing of the hosts 110, 112, 114. In one example, the timer 118 is an IBM Sysplex®. Timer. Alternatively, a separate timer 118 may be omitted, in which case a timer in one of the hosts 110, 112, 114 is used to synchronize the timing of the hosts 110, 112, 114.

Coupling facility 120 is coupled to each of the hosts 110, 112, 114 by a respective connector 122, 124, 126. The connectors 122, 124, 126, may be, for example, Inter System Coupling (ISC), or Internal Coupling Bus (ICB) connectors. The coupling facility 120 includes a cache storage 128 ("cache") shared by the hosts 110, 112, 114, and also includes a processor 130. In one specific example, the coupling facility 120 is an IBM z900 model 100 Coupling Facility. Examples of other suitable coupling facilities include IBM model 9674 C04 and C05, and IBM model 9672 R06. Alternatively, the coupling facility 120 may be included in a server, such as one of the hosts 110, 112, 114.

As an example, some suitable servers for this alternative embodiment include IBM z900 and S/390 servers, which have an internal coupling facility or a logical partition functioning as a coupling facility. Alternatively, the coupling facility 120 may be implemented in any other suitable server. As an example, the processor 130 in the coupling facility 120 may run the z/OS. Alternatively, any suitable shared memory may be used instead of the coupling facility 120. The cache 128 is a host-level cache in that it is accessible by the hosts 110, 112, 114. The cache 128 is under the control of the hosts 110, 112, 114, and may even be included in one of the host machines if desired.

As mentioned above, large multiprocessor computer systems, such as system 100, maintain a large state space in data structures (control blocks). Each task in this system modifies a (small) portion of this state. If a task—due to a hardware failure or a code bug—does an erroneous or incomplete modification to that state, this may go unnoticed for an undefined amount of time (until this state is inspected again by a subsequent task). This item of the state space may affect a single or multiple components of the system (devices etc.).

In the past, there was no way of quickly determining which portions of the large state space were currently active (in the process of being modified). When an error occurred, the entire state space had to be assumed to be inconsistent. As a result, this entire state space had to be scanned for activity in order to bring it back to a consistent state.

The present invention addresses this issue by enhancing and accelerating recovery actions in a large server. The invention does this by:

1) detecting an error when it arises (where possible), and
2) utilizing an infrastructure that allows simple and periodic consistency checks (for example, at designated code points) that detect the error before it causes follow-on problems.

Figure 2:
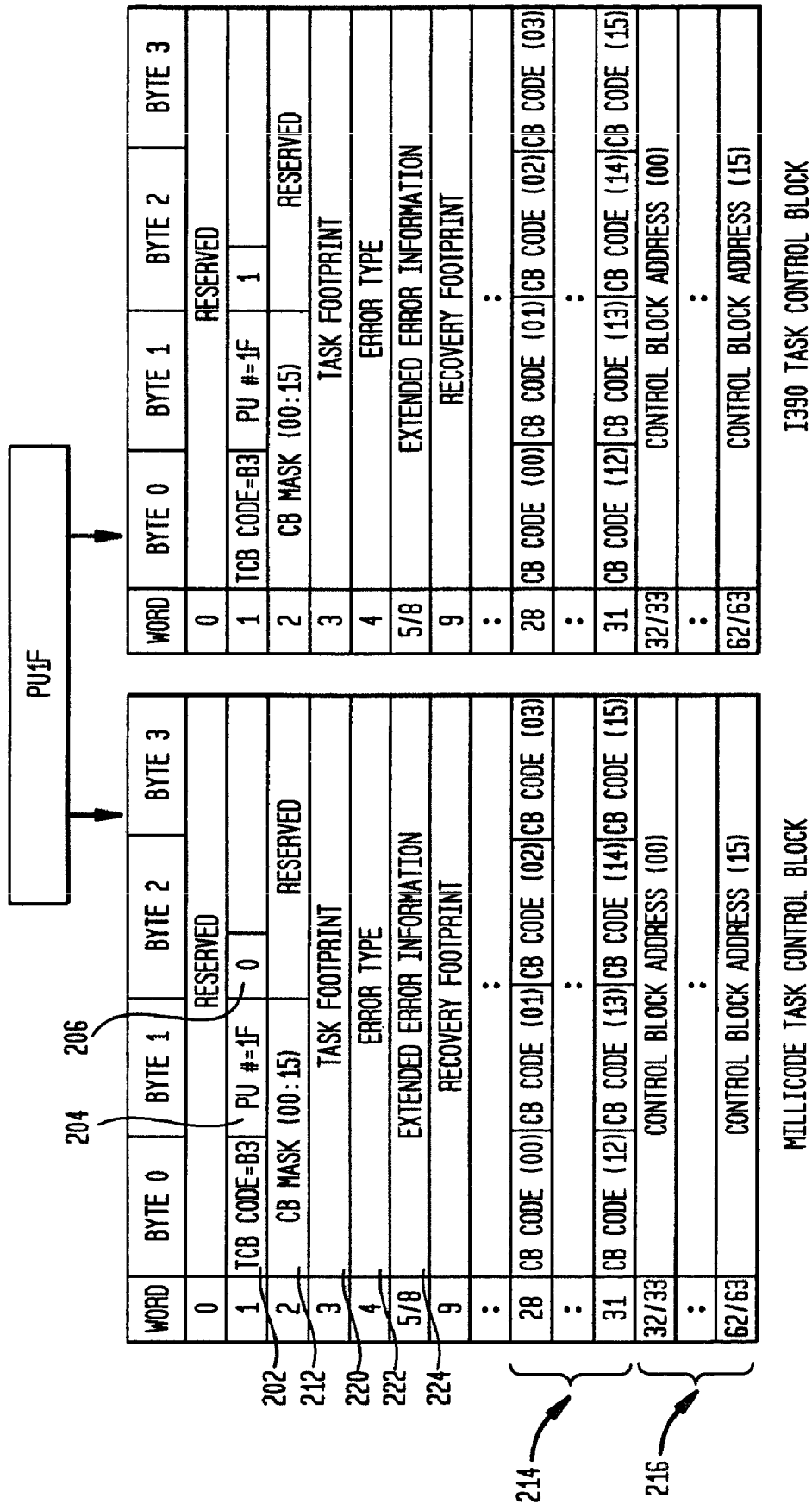
FIG. 2 shows task control blocks that may be used in this invention.

The present invention uses data structures including task control blocks (TCBs) and lock words for the control blocks. These data structures are shown in FIGS. 2 and 3.

Generally, Task Control Blocks (TCB) are used to record which I/O control blocks are in use by each PU. Each PU is preferably assigned 2 TCBs to support the dual operation modes of the PU, i390 mode and millicode mode. A Lock Word structure is defined in the I/O Control Blocks to include an index back into the TCB to facilitate managing the TCB entries. A Lock Word structure is also defined in the I/O Control Blocks to include a unique routine identification code to track task usage of control blocks. The infrastructure described herein is preferably used in mainline I/O code as well as the I/O Subsystem Recovery code.

More specifically, the TCB will contain information about:

The control blocks being used by a PU while executing an I/O task.

PU task state footprint information.

If an error occurs the PU will store error type, error code, and extended error information in the TCB.

Each task running on the PU is assigned a TCB. For example, on the IBM zSeries servers, the PUs can execute in 2 modes, i390 mode or Millicode mode, thus when the present invention is implemented with such servers, there preferably will be 2 TCBs allocated for each PU. Defining unique TCBs per PU for I39O mode and Millicode mode allows greater interleaving of tasks that can occur when processors switch modes while processing functions by keeping the resources used separated. This structure is shown in FIG. 2.

Key TCB Field Definitions
1. TCB Code field 202: Unique static hexadecimal value to identify TCB control block type.
2. PU# field 204: Physical PU number owning the TCB.
3. Mode field 206: Identifier for Millicode or I390 mode
4. Control Block Slot Arrays: Three 16 element arrays that contain:
   Control Block Mask (CBM) Array 212: Indicates that a Control block was locked or in the process of being locked.
   Control Block Code (CBC) Array 214: Contains Control Block Code of the Control Block that was locked or being locked.
   Control Block Address (CBA) Array 216: Contains Control Block Address of the Control Blocks that was lock or being locked.
5. Task Footprint field 220: Indicator of current task step executing on the PU
6. Error Code field 222: Unique Error data stored by failing task.
7. Extended Error Information field 224: Additional data stored by failing task to aid in recovery or problem debug.

I/O Control Block Lock Controls

FIG. 3 illustrates the structure of an I/O control block All I/O Control Block define Word 0 to contain control block lock data. The lock value is a 16 bit encoded value, bits 0-7 characterizing the locking element (PU type), bits 8-15 containing the PU number. This invention now defines bits 16-31 to contain Extended Lock Information data and will be used to contain either unique locking routine ids or TCB Index data.

In accordance with the present invention, the task control blocks are used in the operation of system 100 to enhance and to accelerate recovery action. In particular, in the operation of system 100, a task modifies a very limited amount of state space, which is tracked in the TCB. When an item in the state space is to be modified, it is locked. At this point, the following actions are taken:
1. Compliance with the locking protocol is validated. For example, there is a strict priority rule in which order items of a certain type are to be locked. If this rule is violated, deadlocks are likely to occur (Assume element 1 locks A, element 2 locks B. Assume, element 1 now attempts to lock B and element 2 attempts to lock A. Elements 1 and 2 or now deadlocked).
2. For ease of lookup at unlock time, in the locked item, the TCB slot is remembered where the lock information about this item is kept. Also, a usage vector in the TCB is updated.
3. If all TCB slots are already in use, locking is rejected (i.e., recovery actions are taken). In this case, a task got carried away, possibly blocking major parts of the system. The size of the TCB is designed such that this never happens during regular system activity.

When an item has been updated, it is unlocked. At this point, the following actions are taken:
1. It is ensured that the item was actually locked before (i.e., the lock type bits 0-7 re non-zero). If this is not the case, recovery actions are taken.
2. It is ensured that the item is listed in the TCB in the expected slot.
3. If this is not the case (which may happen in a recovery situation where an item is unlocked on behalf another [failing] element), it is attempted to remove the item from the TCB of the owning element (another processor).
4. The item is removed from the usage vector of the TCB.
5. If the item could not be located in another TCB, recovery actions are taken.

At the regular end of a task, all modifications to the state space are completed. The state space is consistent and the TCB is empty, i.e., it shows no activity on the state space. After the end of a task and before the next task is initiated, the task dispatcher verifies that the TCB usage vector is actually empty. A non-zero usage vector means that at last one item was left locked and must be taken care of by recovery actions. The state tracking allows taking immediate recovery actions. Formerly, the system would have run into a locked item much later, which is much harder to understand, to fix in the code, and in a running system, much harder to recover from.

At any given time, when a task fails (due to a hardware error or a code bug), the TCB shows all items that are in the process of modification. A recovery process can now clean up just these items and bring the system back to a consistent state.

While it is apparent that the invention herein disclosed is well calculated to fulfill the objects stated above, it will be appreciated that numerous modifications and embodiments may be devised by those skilled in the art, and it is intended that the appended claims cover all such modifications and embodiments as fall within the true spirit and scope of the present invention.

What is claimed is:

1. A computer implemented method of detecting errors in a processing unit, the method comprising the steps of:
   assigning a task control block to the processing unit;
   the processing unit beginning a task to modify a group of items;
   locking said group of items and listing said group of items in a usage vector in the task control block to keep track of items being changed by the processing unit;
   during said task, when any item of the group is modified, unlocking and removing said any item from the usage vector;
   at the end of the task, checking to determine if the usage vector is empty of said group of items; and
   responsive to the checking determining that the usage vector is not empty of said group of items at the end of the task, initiating a recovery action to unlock and remove from the usage vector all of the items remaining listed in the usage vector.

2. A method according to claim 1, wherein the step of listing the group of items includes the step of listing in the task control block each item being changed by the processing unit when the processing unit is invoked to change the item.

3. A method according to claim 2, wherein the task control block includes a set of slots, and the listing step includes the step of listing each of said items in a respective one of said slots.

4. A method according to claim 1, wherein the step of checking to determine if the usage vector is empty includes the steps of:
   invoking a recovery process; and
   using the recovery process to check the task control block to determine if any items are listed therein.

5. An error detection system for detecting errors in a given processing unit, wherein the given processing unit processes tasks to change items, the error detection system comprising one or more system processing units configured for:
   assigning a task control block to the given processing unit;
   locking a group of items and listing said group of items in a usage vector in the task control block to keep track of items being changed by the given processing unit when the given processing unit is processing a task;

checking, at the end of the task, if the usage vector is empty of said group of items; and responsive to the checking determining that the usage vector is not empty of said group of items at the end of the task, for initiating a recovery action to unlock and remove from the usage vector all of the items remaining listed in the usage vector.

6. An error detection system according to claim 5, wherein the listing said group of items in the usage vector includes listing in the task control block each item being changed by the given processing unit when the given processing unit is invoked to change the item.

7. An error detection system according to claim 6, wherein the task control block includes a set of slots for listing items being changed by the given processing unit, and listing said group of items in the usage vector includes listing each of said items in a respective one of said slots.

8. An error detection system according to claim 5, wherein the checking the task control block includes:

invoking an error recovery process; and using the error recovery process to check the task control block to determine if any items are listed therein.

9. An error detection system in a computer system including a given processing unit to perform tasks to change items, the error detection system comprising one or more system processing units configured for:

assigning a task control block to the given processing unit;

using the task control block to keep track of items being changed by the given processing unit, wherein the task control block includes a set of slots for listing items being changed by the given processing unit;

checking the task control block at defined times to identify items being changed by the given processing unit at said defined times; and checking the states of said identified items to determine if said states of said identified items are correct;

attempting to lock another one of the items for the given processing unit;

checking the task control block to determine if any of said slots are open; and rejecting the attempt to lock said another one of the items if none of said slots is open; and wherein the using the task control block includes listing in the task control block each item being changed by the given processing unit when the given processing unit is invoked to change the item; and the listing items being changed by the given processing unit includes listing each of said items in a respective one of said slots.

10. A program storage device readable by machine, tangibly embodying a program of instructions executable by the machine to perform method steps for detecting errors in a computer system including a processing unit to perform tasks to change items, said method steps comprising:

assigning a task control block to the processing unit;

beginning a task to modify a group of items;

locking said group of items and listing said group of items in a usage vector in the task control block to keep track of items being changed by the processing unit;

during said task, when any item of the group is modified, unlocking and removing said any item from the usage vector;

at the end of the task, checking to determine if the usage vector is empty of said group of items; and responsive to the checking determining that the usage vector is not empty of said group of items at the end of the task, initiating a recovery action to unlock and remove from the usage vector all of the items remaining listed in the usage vector.

11. A program storage device according to claim 10, wherein the step of listing the group of items includes the step of listing in the task control block each item being changed by the processing unit when the processing unit is invoked to change the item.

12. A program storage device according to claim 11, wherein the task control block includes a set of slots, and the listing step includes the step of listing each of said items in a respective one of said slots.

13. A program storage device according to claim 12, wherein said method steps further comprise:

attempting to lock another one of the items for the processing unit;

checking the task control block to determine if any of said slots are open; and if none of said slots is open, rejecting the attempt to lock said another one of the items.

14. A program storage device according to claim 10, wherein the step of checking the task control block includes the steps of:

invoking a recovery process; and using the recovery process to check the task control block to determine if any items are listed therein.

* * * * *